May 11, 1926.
B. F. BINGAMAN
HOSE COUPLING
Filed Feb. 19, 1923
1,584,353
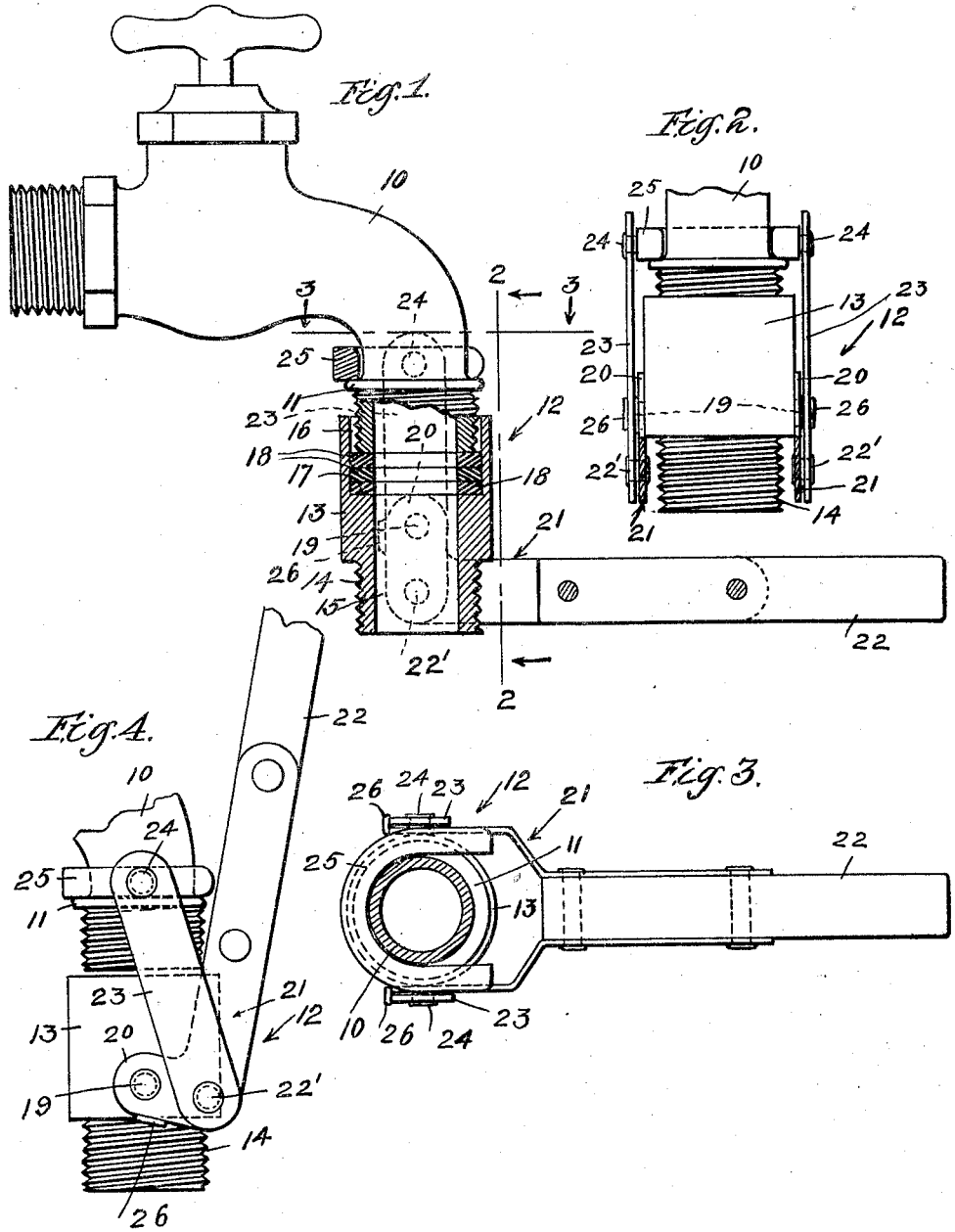
INVENTOR.
Benjamin F. Bingaman
BY
ATTORNEY.

Patented May 11, 1926.

1,584,353

UNITED STATES PATENT OFFICE.

BENJAMIN F. BINGAMAN, OF LOS ANGELES, CALIFORNIA.

HOSE COUPLING.

Application filed February 19, 1923. Serial No. 619,948.

My invention relates to hose couplings, especially designed for use in coupling garden hose to hydrant outlet valves in an expeditious manner.

Couplings, for the above mentioned purpose, now in general use, comprise a threaded socket which is secured to the end of the hose, and adapted to be threaded on to the threaded end of the hydrant outlet valve. This method of coupling the hose, not only consumes an unnecessary amount of time of the operator, in laboriously screwing the hose to the hydrant and unscrewing the same therefrom, but very frequently injures and dirties the hands.

It is the object of my invention to provide a hose coupling, simple of construction and efficient in operation, which will overcome the above mentioned difficulties, and whereby the screwing on and off process will be eliminated.

The above and other objects of my invention will be more fully disclosed in the following specification, reference being had to the accompanying drawings forming a part thereof, in which:

Fig. 1 is a side view of a hydrant outlet valve, showing in section, my coupling applied thereto.

Fig. 2 is a section through the same taken on the line 2—2 of Fig. 1.

Fig. 3 is a section of the same taken on the line 3—3 of Fig. 1.

Fig. 4 is a side view showing the device in the act of being coupled or uncoupled.

In carrying out my invention 10 represents a hydrant spigot or valve which is provided, in the usual manner, adjacent its outlet end, with a flange or shoulder 11.

My coupling device 12, comprises a sleeve 13, externally threaded at 14 on its lower end, adapted to have threaded thereto a hose (not shown) in the usual manner. The bore 15 of the sleeve 13 communicates with the hose and is enlarged at its upper end to form the bore 16 and the shoulder 17 therebetween. Inserted in the bore 16 and resting on the shoulder 17 are the rubber packing washers 18.

Pivoted at 19 on opposite sides of the sleeve 13 are the ends 20 of a yoke 21, the opposite ends of said yoke being secured to a hand lever 22. Pivoted intermediate of the ends of the bell crank yoke 21, at 22', are the ends of links 23, the opposite ends of said links being pivoted at 24 to an open sided collar 25, U shaped in formation, and adapted to engage over the flange or shoulder 11 of the hydrant valve, to clutch or otherwise secure the coupling device to the hydrant valve.

The bell crank yoke 21 is provided with lugs 26 adapted to engage with the edges of the links 23 to form a lock when the device is in an adjusted position with respect to the hydrant valve, as clearly shown in Figs. 1, 2 and 3 of the drawings.

In coupling the hose to the hydrant, the U shaped collar 25 is placed in engagement with the flange 11 with the lever 22 in the position shown in Fig. 4. The lever 22 is then forced downwardly causing the sleeve 13 to move upwardly, and the rubber gaskets to engage with the peripheral edge of the hydrant outlet. Upon continued downward movement of the lever, the gaskets become compressed between the shoulder 17 and the peripheral edge of the hydrant to form a water tight joint, as clearly shown in Fig. 1 of the drawings.

By the above recited construction it will be obvious that I have provided an extremely simple and efficient coupling, which may be adjusted to and removed from the hydrant in a convenient and expeditious manner, without soiling or injuring the hands of the operator.

What I claim is—

In combination with a hydrant faucet having an annular shoulder formed on its discharge end, a coupling comprising a sleeve having an internally shouldered upper end, a gasket disposed in said sleeve and resting on the internal shoulder, the lower end of said sleeve being exteriorly threaded for the reception of a hose, a yoke member adapted to engage the annular shoulder of said faucet, a bell crank lever pivoted to said sleeve, a pair of links pivotally secured at their upper ends to said yoke and at their lower ends to said bell crank lever, and a pair of lugs formed on said bell crank lever for engaging the edges of said pivoted links, whereby to lock said lever in its adjusted position with respect to the faucet.

In witness that I claim the foregoing I have hereunto subscribed my name this 15th day of January, 1923.

BENJAMIN F. BINGAMAN.